United States Patent
Eguchi et al.

(12)

(10) Patent No.: US 6,595,428 B2
(45) Date of Patent: Jul. 22, 2003

(54) PROCESS CONTROL DEVICE AND PROCESS CONTROL METHOD USING A MEDIUM WITH REWRITABLE MARKING TECHNIQUE

(75) Inventors: Koji Eguchi, Hyogo (JP); Hiroshi Mochizuki, Hyogo (JP); Tamio Matsumura, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 171 days.

(21) Appl. No.: 09/730,601

(22) Filed: Dec. 7, 2000

(65) Prior Publication Data

US 2002/0008136 A1 Jan. 24, 2002

(30) Foreign Application Priority Data

May 17, 2000 (JP) ........................................ 2000-144817

(51) Int. Cl.[7] .............................................. G06K 19/06
(52) U.S. Cl. ........................................ 235/493; 235/375
(58) Field of Search ................................. 235/493, 375

(56) References Cited

FOREIGN PATENT DOCUMENTS

JP          62-94252          4/1987

*Primary Examiner*—Thien M. Le
*Assistant Examiner*—Daniel A. Hess
(74) *Attorney, Agent, or Firm*—McDermott, Will & Emery

(57) ABSTRACT

A process control method allowing an operator to readily confirm an order of operation processes includes steps of: reading magnetic data of a control card when the control card is inserted; transmitting completion data based on a lot number identified from read magnetic data to a host computer; receiving update data by the host computer; writing next process data in the received data as a visually recognizable image on the control card; and writing the next process data as a visually recognizable image based on process data identified by the read magnetic data when a predetermined time period passes without receiving update data.

20 Claims, 10 Drawing Sheets

FIG. 5

| LOT NUMBER | NOTE | PRODUCT NUMBER | FIRST PROCESS | SECOND PROCESS | THIRD PROCESS | FOURTH PROCESS | FIFTH PROCESS | ... | CHANGE DATA |
|---|---|---|---|---|---|---|---|---|---|
| 0004140001 | | 1004 | NORMAL COMPLETION OF PROCESS C 00/04/14/16:35:00 | NORMAL COMPLETION OF PROCESS L 00/04/15/08:22:00 | NORMAL COMPLETION OF PROCESS H 00/04/15/10:45:00 | | | | |
| 0004140002 | | 1002 | NORMAL COMPLETION OF PROCESS B 00/04/14/15:20:00 | COMPLETION OF PROCESS H CUTTING ERROR SHORTAGE OF 0.05 mm 00/04/15/08:55:00 | COMPLETION OF PROCESS C OVEREDGE | NORMAL COMPLETION OF PROCESS D 00/04/15/12:25:00 | | | AMOUNT OF CUT IN PROCESS K OF LOT NUMBER 0004140002 IS INCREASED BY 0.05 mm. |
| 0004140003 | ○ DUE DATE 2000/4/30 | 1002 | NORMAL COMPLETION OF PROCESS B 00/04/15/13:30:00 | | | | | | PROGRAM CHANGE FOR PROCESS D FOR LOT NUMBER 0004140003 PROGRAM NUMBER:W2933→W1540 |
| 0004140004 | | 1003 | NORMAL COMPLETION OF PROCESS A 00/04/15/10:14:00 | NORMAL COMPLETION OF PROCESS B 00/04/15/09:10:00 | NORMAL COMPLETION OF PROCESS K 00/04/15/14:25:00 | NORMAL COMPLETION OF PROCESS L 00/04/15/16:10:00 | NORMAL COMPLETION OF PROCESS E NO ABNORMALITY AT INSPECTION 00/04/15/17:10:00 | | |
| 0004140005 | | 1001 | NORMAL COMPLETION OF PROCESS A 00/04/14/10:12:00 | NORMAL COMPLETION OF PROCESS B 00/04/14/13:30:00 | NORMAL COMPLETION OF PROCESS C 00/04/13/15:30:00 | | | | |
| 0004140006 | | 1005 | | | | | | | |

FIG. 6

| PRODUCTION NUMBER : 1001 | | |
|---|---|---|
| PROCESS NUMBER | PROCESS | PROCESS CONDITION |
| 1 | PROCESS A | CUTTING OF 15 SECONDS |
| 2 | PROCESS B | OXIDIZED THIN FILM 0.10 $\mu$m |
| 3 | PROCESS C | AMOUNT OF CUT 10 mm |
| 4 | PROCESS D | PROGRAM NUMBER: W2933 |
| 5 | PROCESS E | INSPECTION STANDARD 3 |
| 6 | PROCESS F | PROGRAM NUMBER: W2934 |
| 7 | PROCESS G | INITIAL COORDINATE X = 0, Y = 30300 |
| 8 | PROCESS H | AMOUNT OF CUT 0.55 mm |

FIG. 7

| PRODUCTION NUMBER : 1002 | | |
|---|---|---|
| PROCESS NUMBER | PROCESS | PROCESS CONDITION |
| 1 | PROCESS B | OXIDIZED THIN FILM 0.15 $\mu$m |
| 2 | PROCESS H | AMOUNT OF CUT 0.5 mm |
| 3 | PROCESS C | AMOUNT OF CUT 3 mm |
| 4 | PROCESS D | PROGRAM NUMBER: W2933 |
| 5 | PROCESS K | AMOUNT OF CUT 1.25 mm |
| 6 | PROCESS L | PROGRAM NUMBER: W305 |
| 7 | PROCESS G | INITIAL COORDINATE X = 0, Y = 1300 |
| 8 | PROCESS A | CUTTING OF 12 SECONDS |
| 9 | PROCESS B | OXIDIZED THIN FILM 0.10 $\mu$m |
| 10 | PROCESS J | IRRADIATION OF 100 SECONDS |

FIG. 8

| PRODUCTION NUMBER : 1003 | | |
|---|---|---|
| PROCESS NUMBER | PROCESS | PROCESS CONDITION |
| 1 | PROCESS A | CUTTING OF 10 SECONDS |
| 2 | PROCESS B | OXIDIZED THIN FILM 0.08 $\mu$m |
| 3 | PROCESS K | AMOUNT OF CUT 1.25 mm |
| 4 | PROCESS L | PROGRAM NUMBER: W3053 |
| 5 | PROCESS E | INSPECTION STANDARD 4 |
| 6 | PROCESS D | PROGRAM NUMBER: W2944 |
| 7 | PROCESS G | INITIAL COORDINATE X = 0, Y = 1200 |

FIG. 9

| PRODUCTION NUMBER : 1004 | | |
|---|---|---|
| PROCESS NUMBER | PROCESS | PROCESS CONDITION |
| 1 | PROCESS C | AMOUNT OF CUT 2.5 mm |
| 2 | PROCESS L | PROGRAM NUMBER: H1212 |
| 3 | PROCESS H | AMOUNT OF CUT 0.5 mm |
| 4 | PROCESS C | AMOUNT OF CUT 4.5 mm |
| 5 | PROCESS B | OXIDIZED THIN FILM 0.10 $\mu$m |
| 6 | PROCESS A | CUTTING OF 15 SECONDS |
| 7 | PROCESS B | OXIDIZED THIN FILM 0.10 $\mu$m |
| 8 | PROCESS G | INITIAL COORDINATE X = 10, Y = 10 |
| 9 | PROCESS H | AMOUNT OF CUT 0.4 mm |
| 10 | PROCESS E | INSPECTION STANDARD 2 |

FIG. 10

| PRODUCTION NUMBER : 1005 | | |
|---|---|---|
| PROCESS NUMBER | PROCESS | PROCESS CONDITION |
| 1 | PROCESS K | AMOUNT OF CUT 3 mm |
| 2 | PROCESS G | INITIAL COORDINATE X = 10, Y = 10 |
| 3 | PROCESS J | IRRADIATION OF 100 SECONDS |
| 4 | PROCESS B | OXIDIZED THIN FILM 0.12 $\mu$m |
| 5 | PROCESS C | AMOUNT OF CUT 3 mm |
| 6 | PROCESS D | PROGRAM NUMBER: W304 |
| 7 | PROCESS L | PROGRAM NUMBER: B1002 |
| 8 | PROCESS C | AMOUNT OF CUT 3 mm |

FIG. 15A TERMINAL DEVICE → HOST COMPUTER (BEFORE STARTING AN OPERATION)

| COMMUNICATION HEADER | LOT NUMBER | DATA END FLAG |
|---|---|---|

| SENDER TERMINAL FLAG | INQUIRY DATA FLAG |
|---|---|

FIG. 15B HOST COMPUTER → TERMINAL DEVICE (BEFORE STARTING AN OPERATION)

| COMMUNICATION HEADER | LOT NUMBER (COLOR DATA) | NEXT PROCESS CONDITION DATA | DATA END FLAG |
|---|---|---|---|

| DESTINATION TERMINAL FLAG | RESPONSE DATA FLAG | | PROCESS CONDITION (COLOR DATA) | CHANGE CONDITION (COLOR DATA) | NOTE (COLOR DATA) |
|---|---|---|---|---|---|

FIG. 15C TERMINAL DEVICE → HOST COMPUTER (AFTER AN OPERATION)

| COMMUNICATION HEADER | LOT NUMBER | COMPLETION DATA | DATA END FLAG |
|---|---|---|---|

| SENDER TERMINAL FLAG | COMPLETION DATA FLAG |
|---|---|

FIG. 15D HOST COMPUTER → TERMINAL DEVICE (AFTER AN OPERATION)

| COMMUNICATION HEADER | LOT NUMBER | NEXT PROCESS DATA | SUBSEQUENT N PROCESS DATA | DATA END FLAG |
|---|---|---|---|---|

| DESTINATION TERMINAL FLAG | UPDATE DATA FLAG | | NEXT PROCESS CONDITION DATA | | FIRST SUBSEQUENT PROCESS | SECOND SUBSEQUENT PROCESS | THIRD SUBSEQUENT PROCESS | ... | Nth SUBSEQUENT PROCESS |
|---|---|---|---|---|---|---|---|---|---|

PROCESS CONTROL DEVICE AND PROCESS CONTROL METHOD USING A MEDIUM WITH REWRITABLE MARKING TECHNIQUE

BACKGROUND OF THE INVENTION

1. Field of the Invention

The present invention relates to devices to control production processes at sites such as factories, and more particularly to devices and methods to control information such as an order of plurality of operation processes, an operation condition of each operation process, and a result of an operation.

2. Description of the Background Art

A production of a plurality of products produced through a plurality of production processes is controlled in the following manner, for example. A control table including an indication of an order of operations and operation conditions is attached to a product. Based on the control table, an operator sets an operation condition at a production facility of each operation process and starts the operation. After the completion of the operation, the operator writes a result (a result of inspection, a measured value, or the like) of the operation into the control table.

A method to control processes related with the present invention is disclosed in Japanese Patent Laying-Open No. 62-94252. According to the method, an operator can know an order of operation processes and an operation condition at each operation process without using the control table and the operator does not need to write a result of the operation into the control table.

According to the method to control processes disclosed in the official gazette, an LSI (Large Scale Integrated Circuit) with a readable and writable RAM (Random Access Memory) mounted on a plastic plate is employed, and, an operation condition and an operation history of every production facility can be written to the RAM. The method includes steps of writing an operation condition into an LSI card; reading an operation condition from the LSI card; writing an operation history into the LSI card; and performing progress chasing of the process by reading out the operation history written in the LSI card.

According to this method, an operation condition written into the LSI card at the step of writing an operation condition is read out from the LSI card at the step of reading an operation condition. The operation history written into the LSI card at the step of writing an operation history is read out from the LSI card at the step of performing progress chasing. Thus, the progress chasing of process is performed. One can set an operation condition at a production facility based on the operation condition written into the LSI card, and, one can perform a process control based on information on the operation result written into the LSI card. As a result, no control table is required.

According to this method, however, when an operator needs to see a content stored in the RAM of the LSI card, the operator has to go to a place where the LSI card reader is installed. There, the operator has to insert the LSI card into an LSI card reader and to look at a content displayed on a display portion of the LSI card reader. For an efficient follow-up of the process, many LSI card readers must be installed. When the LSI card reader becomes inoperative, the operator cannot see the content stored in the RAM of the LSI card and must stop the operation.

SUMMARY OF THE INVENTION

An object of the present invention is to provide a device and a method for process control, allowing an operator to readily confirm an order of operation processes, an operation condition at each operation process and so on.

Another object of the present invention is to provide a device and a method for process control, allowing an operator to readily set an operation condition of each operation process.

Still another object of the present invention is to provide a device and a method for process control, allowing an operator to readily confirm a result of an operation at each process.

Still a further object of the present invention is to provide a device and a method for process control, allowing an operator to know an order of processes even when a computer controlling the process becomes inoperative.

A process control device according to the present invention is a process control device to control processes of producing a product with a medium attached to the product, the medium allowing a recording of data in a first recording manner and a recording of a visually recognizable image in a second recording manner, and the process control device includes: a read circuit to read data recorded in the first recording manner on the medium; a transmit circuit connected to the read circuit to transmit the data to a computer connected to the process control device; a receive circuit to receive, from the computer, process data of the product in the process based on the data; and an image recording circuit connected to the receive circuit to record an image on the medium in the second recording manner, based on the process data.

The image recording circuit records an image on a medium in the second recording manner based on process data received from the computer at receiving circuit. A next process or a process condition of the next process can be repeatedly recorded on the medium in a visually recognizable manner based on the order of processes received from the computer controlling the processes. The operator can visually and readily confirm the order of operation processes and the operation condition of each operation process.

Still preferably, the process data includes information indicating the operation condition of the next process of the product, and the image includes a barcode indicating the operation condition of the next process of the product.

Based on process data received from the computer, an operation condition is displayed as a barcode. The operator can readily input an operation condition by having a barcode reader device for setting an operation condition of production facility read the barcode.

Still preferably, the process data includes information indicating a result of an operation in a previous process of the product and the image includes a character indicating a result of an operation in the previous process of the product.

Based on the process data received from the computer, the result of the operation in the previous process is displayed as a character. The operator can readily and visually confirm the result of the operation in the previous process.

Still preferably, the receive circuit includes a circuit to receive subsequent process information indicating a plurality of following processes of the product based on the data; and the process control device further includes a recording circuit to record the subsequent process information on the medium in the first recording manner, and the image recording circuit includes a recording circuit to record a character indicating the next process on the medium in the second recording manner based on the subsequent process information recorded by the recording circuit when reception of process data by the receive circuit is impossible.

When the receiving circuit cannot receive process data from the computer, the recording circuit reads out the information indicating the plurality of following processes, which processes are recorded by the first recording circuit, and records a character indicating the next process on the medium in the second recording manner. Even when the communication between the process control device and the computer is not allowed, the operator can readily and visually confirm the following processes.

A process control method according to another aspect of the present invention is a process control method to control a process of producing a product with a medium attached to the product, which medium allowing a recording of data in a first recording manner and a recording of a visually recognizable image in a second recording manner, and which process control method includes the steps of: reading data recorded in the first recording manner on the medium; transmitting the data to a computer controlling the process; receiving process data of the product in the process based on the data from the computer; and recording an image on the medium in the second recording manner based on the process data.

In the step of recording an image, the image is recorded on the medium in the second recording manner based on the process data received from the computer at the step of receiving. Data of the next process or the operation condition of the next process or the like based on the order of processes received form the computer controlling the processes, can be repeatedly recorded on the medium in a visually recognizable manner. As a result, the operator can readily confirm the order of processes, the operation condition of each operation process and so on.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a progress chasing table, which is controlled by a process controlling host computer;

FIGS. 6 to 10 are diagrams showing operation processes of a product;

FIGS. 15A to 15D are diagrams showing data transmitted between a process control device and a host computer.

DESCRIPTION OF THE PREFERRED EMBODIMENT

Figure 1:
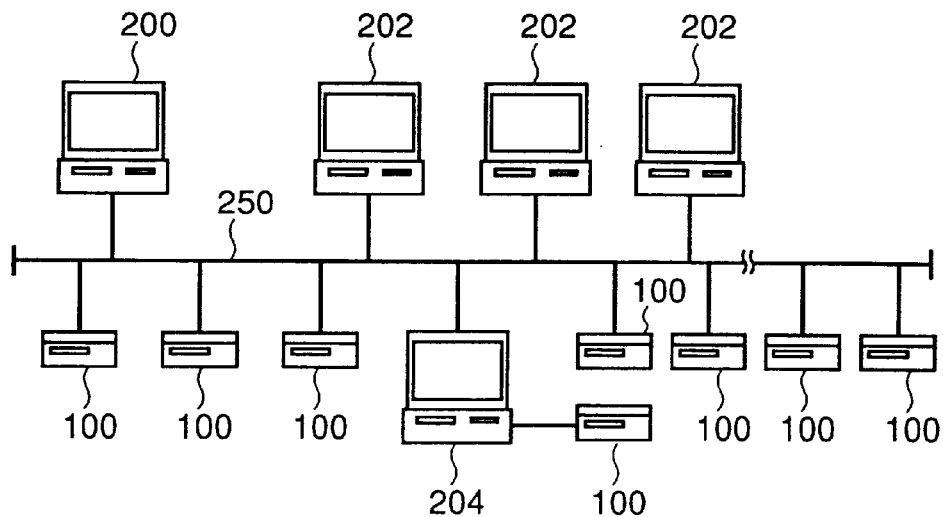
FIG. 1 is a diagram showing an overall structure of a process control system.

In the following, preferred embodiment of the present invention will be described with reference to the drawings. Throughout the following description and the drawings, the same portion is denoted by the same reference character. The name and the function thereof are also the same. Hence, the detailed description thereof will not be repeated where appropriate.

With reference to FIG. 1, a process control system using a process control device 100 according to the embodiment includes, a plurality of process control devices 100, a process controlling host computer 200, a progress chasing information retrieval computer 202, an operation result inputting computer 204, and a network 250 connecting the plurality of process control devices 100, process controlling host computer 200, progress chasing information retrieval computer 202, and operation result inputting computer 204. Here, process control device 100 is arranged corresponding to an arrangement of production facility for each operation process.

In this process control system, a process control is performed using a control card provided for each product lot. The control card has an image display portion to display a character image, a barcode image or the like on its top surface and has a magnetic stripe to record a number of a lot or the like in a magnetic data format on its bottom surface.

Process controlling host computer 200 performs a progress chasing for each production lot based on information transmitted from each process control device 100. Progress chasing information retrieval computer 202 allows retrieval of progress chasing information stored in process controlling host computer 200 based on a lot number or the like. When an operation of the operation process completes, data (such as a measured value of the product after the completion of the operation process, a result of an inspection, or the like) indicating a result of the operation performed in the operation process is input into operation result inputting computer 204 and the input result data is transmitted to process controlling host computer 200.

Figure 2:
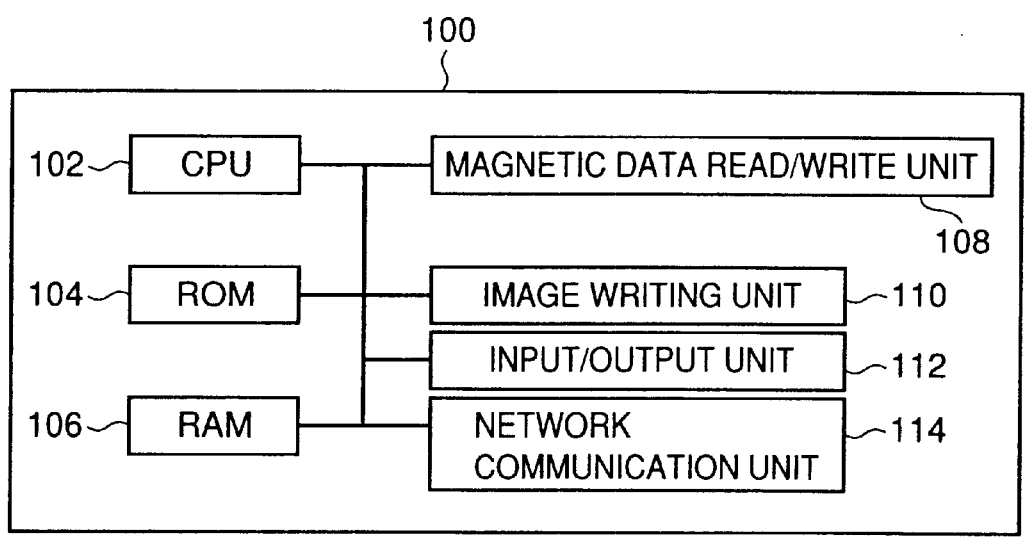
FIG. 2 is a block diagram showing hardware of a process control device.

With reference to FIG. 2, process control device 100 includes a CPU (Central Processing Unit) 102 to control each portion of process control device 100, an ROM (Read Only Memory) 104 to store a program performed in CPU 102, an RAM (Random Access Memory) 106 to store an intermediate result or the like of the program performed in CPU 102, a magnetic data read/write unit 108 to read out magnetic data on a magnetic stripe applied on the control card and to write magnetic data in the magnetic stripe, an image writing unit 110 to write an image to the image display portion provided on the top surface of the control card, an input/output unit 112 with an input button for indicating an operation completion or the like, and a network communication unit 114 connected with process controlling host computer 200 to perform transmission of data to/from process controlling host computer 200. Here, CPU 102, ROM 104, RAM 106, magnetic data read/write unit 108, image writing unit 110, input/output unit 112 and network communication unit 114 are connected with each other through a bus.

According to the program performed in CPU 102, a lot number which is stored in the magnetic stripe of the control card and read out through magnetic data read/write unit 108 is transmitted to process controlling host computer 200 via network communication unit 114. Further, according to the program performed in CPU 102, and, based on data received from process controlling host computer 200 via network communication unit 114, write data to be displayed on the image display portion of the control card is generated and an instruction is given to image writing unit 110 to write an image based on the generated write data.

In addition, image writing unit 110 allows to write a barcode image besides a character image indicating a name of an operation process or the like on the image display portion of the control card. Further, image writing unit 110 allows writing an image in more than one color in the image display portion of the control card based on an instruction received via network communication unit 114 from process controlling host computer 200.

Figure 3:
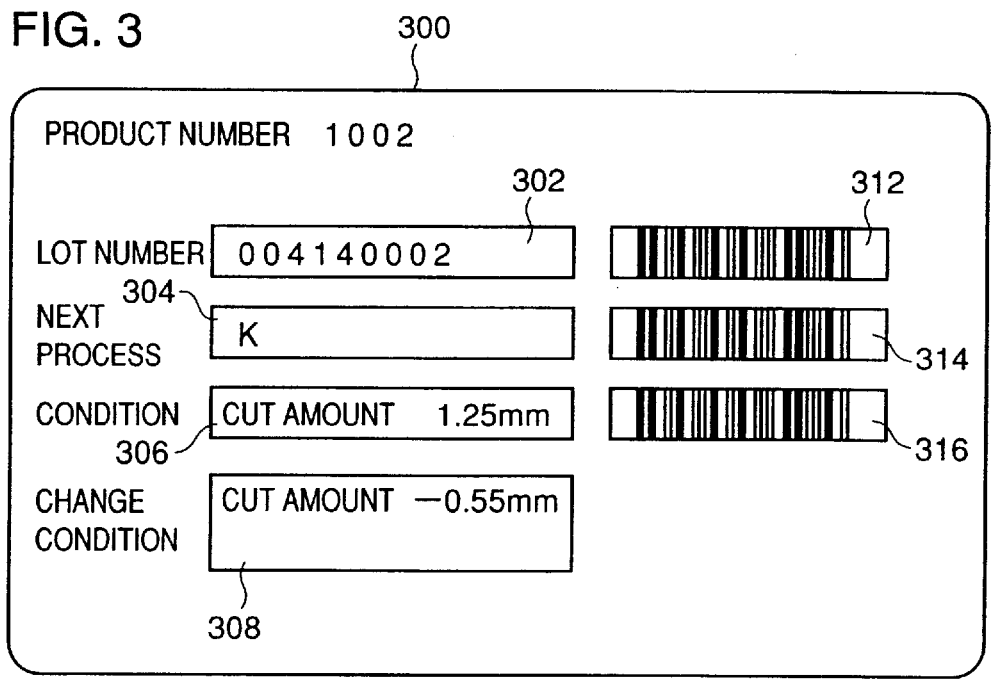
FIG. 3 is a diagram showing a top surface of a control card.

With reference to FIG. 3, a control card 300 on its top surface includes a first image display portion 302 to display a lot number of a product to which control card 300 is attached, a second image display portion 312 to display a barcode corresponding to the lot number, a third image display portion 304 to display a process name of a next process for the product, a fourth image display portion 314 to display a barcode corresponding to the process name of the next process, a fifth image display portion 306 to display a process condition of the next process, a sixth image display portion 316 to display a barcode corresponding to the process condition, and a seventh image display portion 308 to display a changed process condition. To these image display portions 302 to 316, an image of a character, a barcode or the like can be written repeatedly through a rewritable marking technique.

The rewritable marking technique is used for rewriting a character or an image and performed with a medium on which a recording and an erasure of image can be performed through heating. When a thin film is made by a resin containing a low molecular compound such as a fatty acid dispersed therein and heated, an air gap is produced at an interface of fine particles and resin causing the film to become white, and an image can be recorded. When heated to a higher temperature, the fine particles are dissolved to make the film transparent and the image can be erased. For heating, a thermal head is used and rewriting can be performed about 500 times for each card. Alternatively, a technique using a coloring and a decolorizing with dye, or a magnetic material is available. In the present embodiment, the description is given based on the rewritable marking technique. This is not a limiting example and as far as the image display portion is formed with a medium allowing repeated recording and erasure of an image, any technique can be employed.

Figure 4:
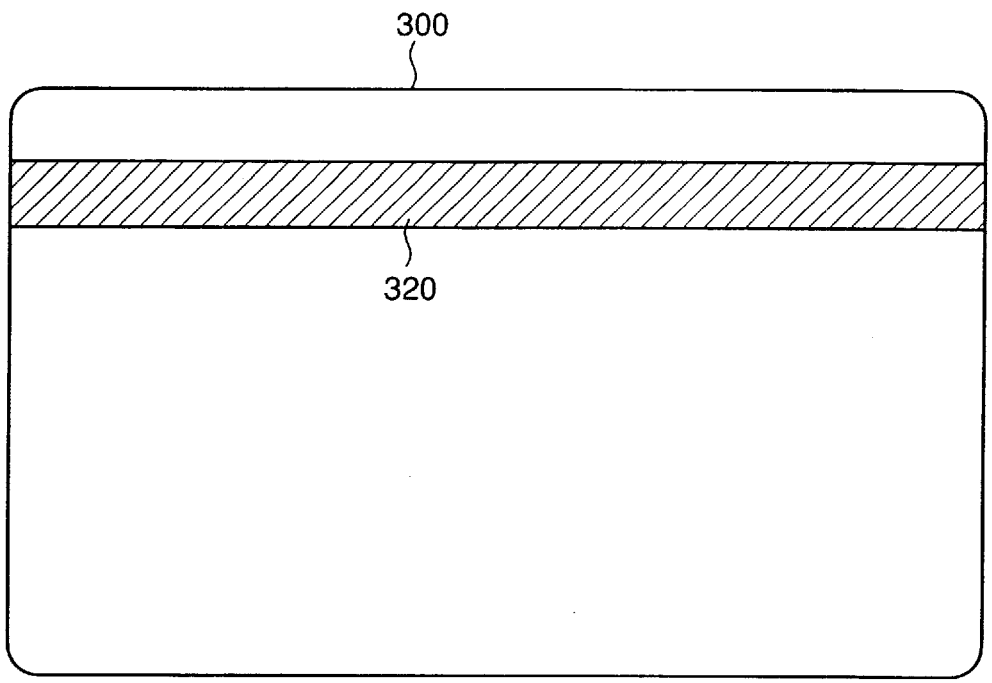
FIG. 4 is a diagram showing a bottom surface of a control card.

With reference to FIG. 4, control card 300 has a magnetic stripe 320 applied on its bottom surface, storing magnetic data. Magnetic stripe 320 stores, in a magnetic data format, a lot number and a process in which a product with control card 300 attached is processed.

With reference to FIG. 5, a progress chasing table stored in a fixed disc or the like of process controlling host computer 200 will be described. As shown in FIG. 5, the progress chasing table stores, for each lot number, a note, a product number, first to last processes, and change data. For example, the table stores for a product with a lot number "0004140002", the product number "1002" and a process completion data indicating that a first process, which is process B, a second process, which is process H, a third process, which is process C, and a fourth process, which is process D, have been completed. In addition, the table stores, for the product with the lot number "0004140002", data indicating that a cutting in the second process, which is process H, did not reach a requirement by 0.05 mm. Further, the table stores change data indicating that an amount of cut is increased by 0.05 mm at a fifth process, which is process K.

Further, the process completion data includes data on a date and a time of process completion. Through comparison of a completion time of a previous process and a current time based on the date and time of the process completion, a product remaining in the process line for a long time can be detected. Further, a note is stored such as a due date for the product with the lot number "0004140003".

Here, the lot number is a combination of numerals and symbols allowing an unique identification of a product currently under production and a plurality of lot numbers are assigned to one product number.

With reference to FIGS. 6 to 10, operation process data of a product will be described, which data is stored in a fixed disc or the like of the process controlling host computer. FIG. 6 shows an operation process of a product with a product number "1001", FIG. 7 shows an operation process of a product with a product number "1002", FIG. 8 shows an operation process of a product with a product number "1003", FIG. 9 shows an operation process of a product with a product number "1004", and FIG. 10 shows an operation process of a product with a product number "1005". For example, FIG. 6 shows that, for the product with product number "1001", the first process is process A and the process condition is cutting of 15 seconds. Further, as for a process of oxidized thin film formation, the process condition (that is, a thickness of an oxidized thin film to be formed) of the product with product number "1001" is 0.10 $\mu$m, for the product with product number "1002", 0.15 $\mu$m, for the product with product number "1003", 0.08 $\mu$m, for the product with product number "1004", 0.10 $\mu$m and for the product with product number "1005", 0.12 $\mu$m, respectively, and thus the process condition is different according to product number. In such case, at a production facility for a process of oxidized thin film formation, the process condition must be changed corresponding to the product number.

To a production facility in an operation process, a barcode reader device is connected to input a process condition. A process condition can be input to the production facility through the barcode reader device reading a process condition represented as a barcode.

When a process condition is changed, change data is stored in a storage region for change data shown in FIG. 5 described above. The change data indicating a change in condition is input through process controlling host computer 200 with a lot number.

Figure 11:
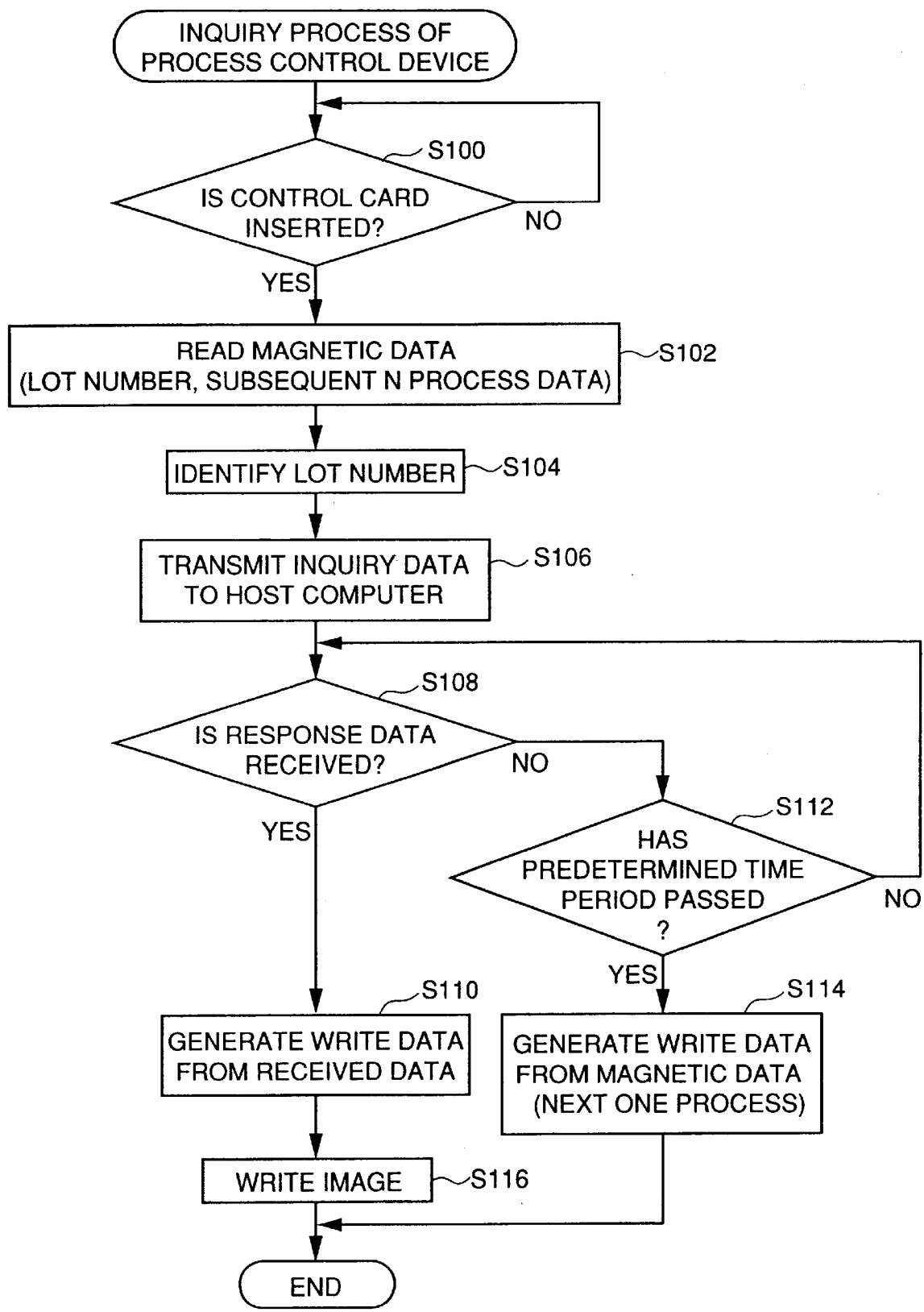
FIG. 11 is a flow chart showing a control flow of an inquiry process in a process control device.

With reference to FIG. 11, a program performed in process control device 100 has the following control structure with regard to an inquiry process.

At step 100 (hereinafter S means a step), CPU 102 determines whether control card 300 is inserted into magnetic data read/write unit 108 or not. When control card 300 is inserted (YES in S100), the process proceeds to S102. If control card 300 is not inserted (NO in S100), the process returns to S100 and waits until control card 300 is inserted.

At S102, CPU 102 reads magnetic data from magnetic stripe 320 of inserted control card 300 through magnetic data read/write unit 108. The magnetic data read in this step includes data indicating a lot number and subsequent N (N is a natural number) processes.

At S104, CPU 102 identifies the lot number read at S102. At S106, CPU 102 transmits inquiry data including a lot number to process controlling host computer 200 via network communication unit 114.

With reference to FIG. 15A, inquiry data transmitted from process control device 100 to process controlling host computer 200 includes a communication header, a lot number, and a data end flag. Further, the communication header includes a sender terminal flag and an inquiry data flag.

Process controlling host computer 200 identifies process control device 100 transmitting the inquiry data based on the sender terminal flag and identifies a type of transmitted data with inquiry data based on the inquiry data flag.

At S108, CPU 102 determines whether response data has been received from process controlling host computer 200 via network communication unit 114 or not. When the response is received from process controlling host computer 200 (YES in S108), the process proceeds to S110. If the response is not received from process controlling host computer 200 (NO in S108), the process proceeds to S112.

With reference to FIG. 15B, the response data transmitted from process controlling host computer 200 to process control device 100 includes a communication header, a lot number, next process data, condition data of the next process, and a data end flag. The communication header includes a destination terminal flag and a response data flag. Process control device 100 identified based on the destination terminal flag identifies a type of transmitted data with the response based on the response data flag included in the communication header. Further, the condition data of the next process includes process condition data, change condition data, and note data. Further, the lot number, the next process data, the next process condition data, the change condition and the note, thus transmitted, include color data to be used for display on the image display portion of the control card.

At S110, CPU 102 generates write data to be written into image display portions 302 to 316 based on a response received from process controlling host computer 200. The write data includes data indicating a character image and a barcode image. The lot number, the next process data and so on included in the response are encoded and transmitted from process controlling host computer 200. CPU 102 of process control device 100 converts encoded data into character data using a data conversion table stored in RAM 106 and then converts the character data into a character image. Further, CPU 102 converts character data into a barcode image using a barcode conversion table stored in RAM 106. Here, the character data includes data indicating color of each of lot number, next process data, a process condition, a change condition and a note to be displayed.

At S112, CPU 102 determines whether a predetermined time period has passed without receiving a response from process controlling host computer 200 or not. When the predetermined time period has passed (YES in S112), the process proceeds to S114. If the predetermined time period has not passed (NO in S112), the process returns to S108 and waits for the response from process controlling host computer 200.

At S114, CPU 102 generates write data to be written into the image display portion based on magnetic data received at S102. In this case, write data to be written into image display portions 304 and 314 is generated based on read data of subsequent N processes. Data (encoded data) indicating a next one process, that is, a first process among N processes read at S102 is converted into character data according to the data conversion table stored in RAM 106 and further converted into a character image. In addition, the character data is converted into a barcode image.

At S116, CPU 102 writes generated write data in a form of an image into image display portions 302 to 316 of control card 300 via image writing unit 110. In other words, the image data produced as a character image or a barcode image through conversion is written into each of image display portions 302 to 316 through image writing unit 110. At this time, the character image is written in a color designated for each of the lot number, the next process data, the process condition, the change condition and the note.

Figure 12:
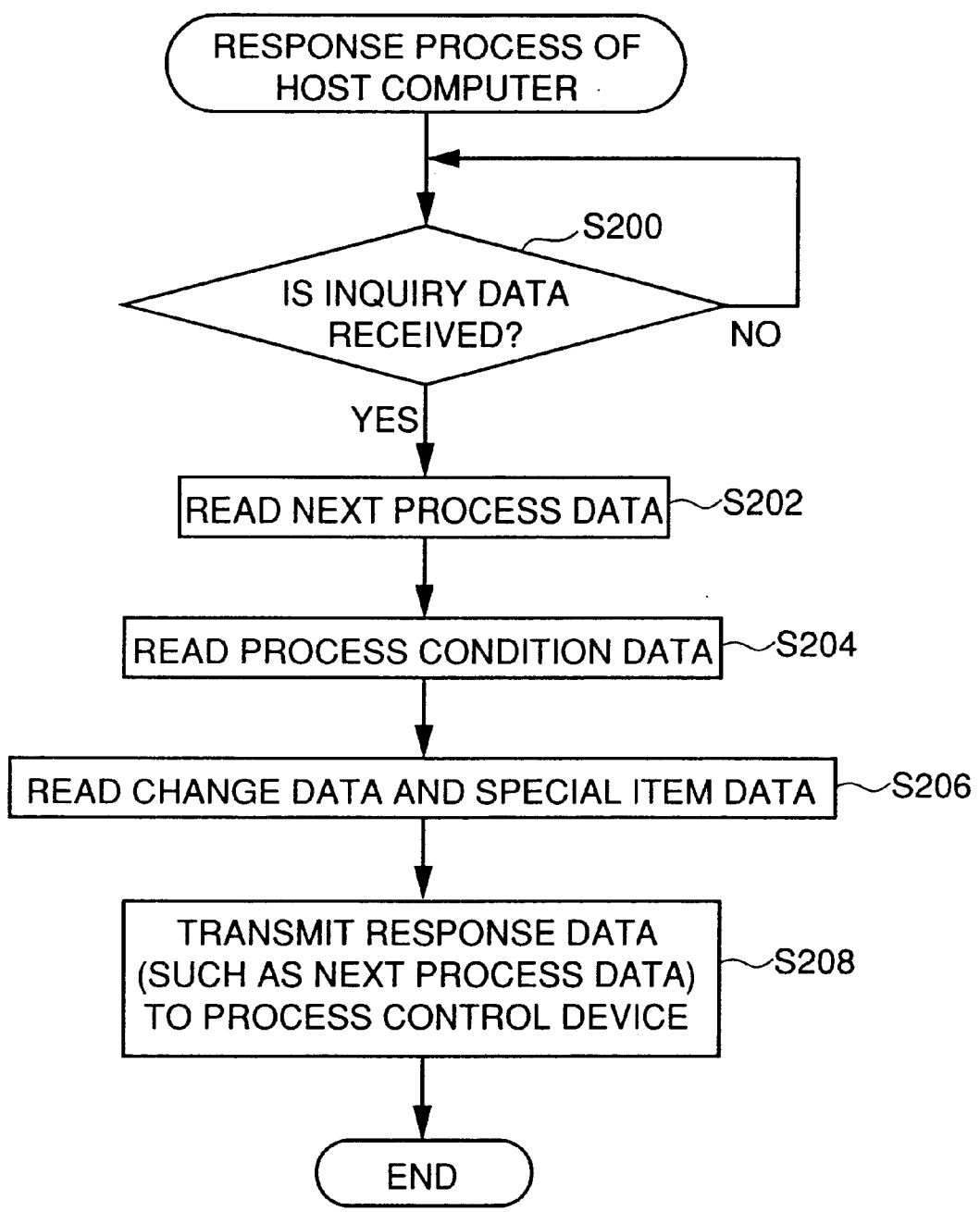
FIG. 12 is a flow chart showing a control flow of an response process in a host computer.

With reference to FIG. 12, a program performed in process controlling host computer 200 has the following control structure for a response process. Here, process controlling host computer 200 is, for example, a general computer, a workstation or the like including a CPU, a memory, a fixed disc, a monitor and a keyboard.

At S200, the CPU of process controlling host computer 200 determines whether inquiry data (data shown in FIG. 15A) including a lot number is received from any of process control devices 100 or not. If inquiry data is received from any of process control devices 100 (YES in S200), the process proceeds to S202. If the inquiry data is not received (NO in S200), the process returns to S200 and waits for inquiry data from any of process control device 100.

At S202, the CPU of process controlling host computer 200 reads out a product number and next process data corresponding to a lot number included in the received inquiry data based on the lot number included in the received inquiry data and the progress chasing table (a table shown in FIG. 5) stored in a fixed disc.

At S204, the CPU of process controlling host computer 200 reads out process condition data of the next process from operation process data (data shown in FIGS. 6 to 10) based on the product number and data of the next process read at S202.

At S206, the CPU of process controlling host computer 200 reads out change data corresponding to a received lot number from the progress chasing table. In addition, the CPU reads out, if there is a note corresponding to the received lot number, data corresponding thereto.

At S208, the CPU of process controlling host computer 200 transmits the next process data read at S202, the process condition data of the next process read at S204, and the response including the change data and the note data read at S206 to process control device 100 which sent the lot number. The response transmitted at this time is shown in FIG. 15B as described above.

Figure 13:
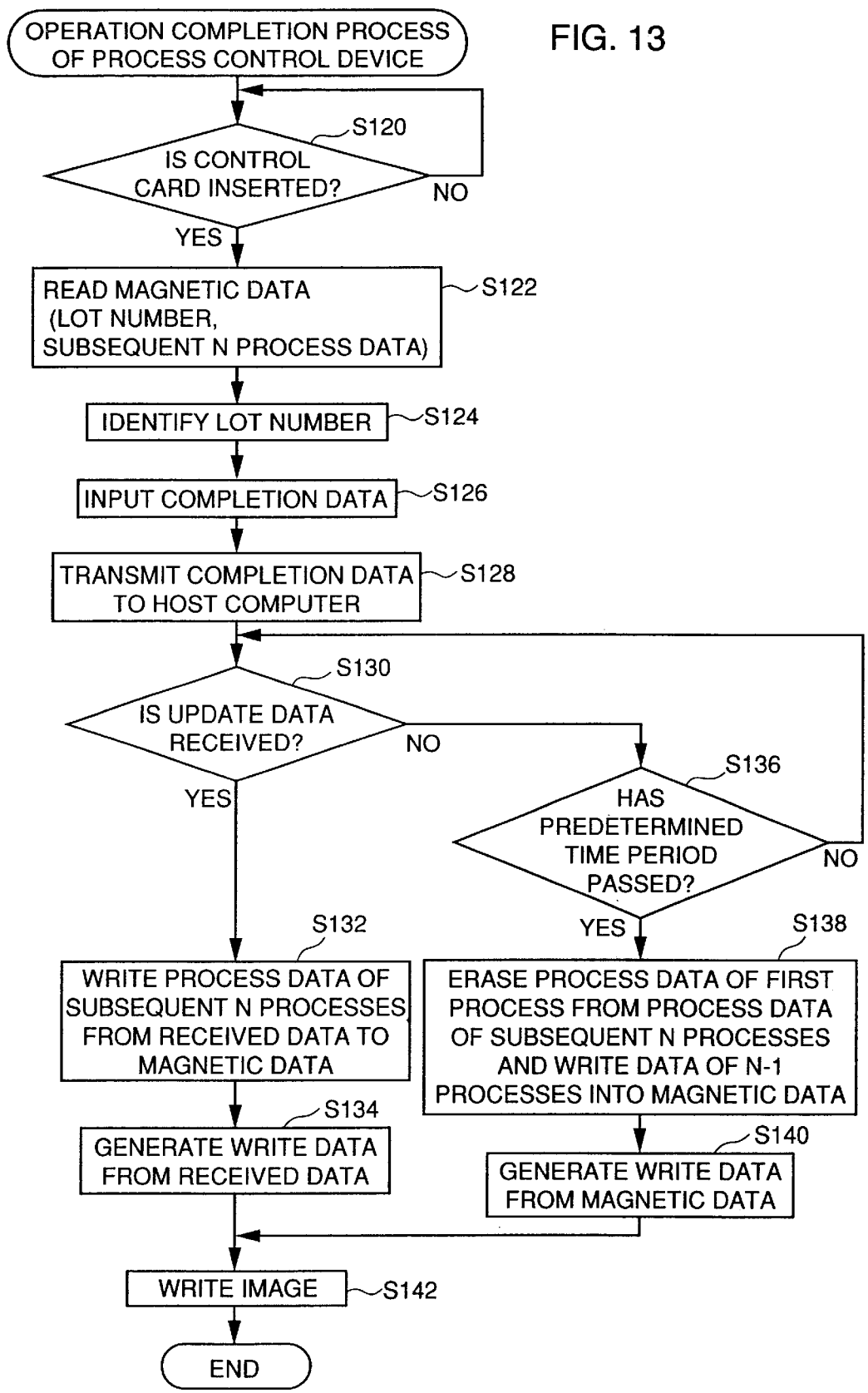
FIG. 13 is a flow chart showing a control flow of an operation completion process in a process control device.

With reference to FIG. 13, a program performed in process control device 100 has the following control structure with regard to an operation completion process.

At S120, CPU 102 determines whether control card 300 is inserted into magnetic data read/write unit 108 or not. When control card 300 is inserted (YES in S120), the process proceeds to S122. When control card 300 is not inserted (NO in S120), the process returns to S120 and waits for the insertion of control card 300.

At S122, CPU 102 reads out magnetic data out of magnetic stripe 302 of inserted control card 300 via magnetic data read/write unit 108. The magnetic data read out at this time is indicating a lot number and subsequent N processes. At S124, CPU 102 identifies the lot number read at S122. At S126, CPU 102 confirms an input of completion data via input/output unit 112. The confirmation is performed, for example, through pushing down a completion-indicating button provided in input/output unit 112 of process control device 100. Further, in case of an inspection process or the like, the confirmation is performed as the input of result data through operation result inputting computer 204.

At S128, process control device 100 transmits completion data including the lot number and completion data to process controlling host computer 200. With reference to FIG. 15C, the completion data transmitted from process control device 100 to process controlling host computer 200 at this time includes the communication header, the lot number, the completion data and the data end flag. The communication header includes a sender terminal flag and a completion data flag. Process controlling host computer 200 identifies process control device 100 having performed transmission based on the sender terminal flag and identifies the transmitted data with the completion data based on the completion data flag.

At S130, CPU 102 determines whether update data has been received from process controlling host computer 200 or not. When the update data is received from process controlling host computer 200 (YES in S130), the process proceeds to S132. When the update data is not received from process controlling host computer 200 (NO in S130), the process proceeds to S136. With reference to FIG. 15D, the update data transmitted from process controlling host computer 200 to process control device 100 at this time includes a communication header, a lot number, next process data, condition data of the next process, data of subsequent N processes, and a data end flag. The communication header includes a destination terminal flag and an update data flag. Process control device 100 identified based on the destination terminal flag identifies a type of transmitted data with update data based on the update data flag included in the communication header. Further, the data of subsequent N processes includes first subsequent process data, second subsequent process data, . . . , and Nth subsequent process data. Here, N is calculated based on the number of processes which is expected to be performed during communication breakdown between process control device 100 and process controlling host computer 200. In practice, mostly, N=2 to 10 approximately.

At S132, CPU 102 writes the process data corresponding to subsequent N processes from data received from process controlling host computer 200 at S130 in a magnetic data format into magnetic stripe 320 of control card 300 via magnetic data read/write unit 108.

At S134, CPU 102 generates write data to be written into image display portions 302 to 316 of control card 300 from data received from process controlling host computer 200. Because this process is the same as the process in S110 described above, the detailed description thereof will not be repeated here.

At S136, CPU 102 determines whether a predetermined time period has passed without receiving update data from process controlling host computer 200 or not. When the predetermined time period has passed (YES in S136), in other words, if the communication with process controlling host computer 200 does not work for some reason, the process proceeds to S138. When the predetermined time period has not passed (NO in S136), the process returns to S130 and waits for update data from process controlling host computer 200.

At S138, CPU 102 erases process data of the first process among the data of subsequent N processes and generates data of (N−1) processes. The generated data is written via magnetic data read/write unit 108 into magnetic stripe 320 of control card 300 in a magnetic data format.

At S140, CPU 102 generates write data to be written into image display portions 302 to 316 of control card 300 from magnetic data read at S122. At this time, write data written into image display portions 304 and 314 is indicating the first process among (N−1) processes. As other processes are the same as the process in S114 described above, the detailed description thereof will not be repeated here.

At S142, CPU 102 writes write data generated at S134 or S140 into image display portions 302 to 316 of control card 300 as an image via image writing unit 110.

Figure 14:
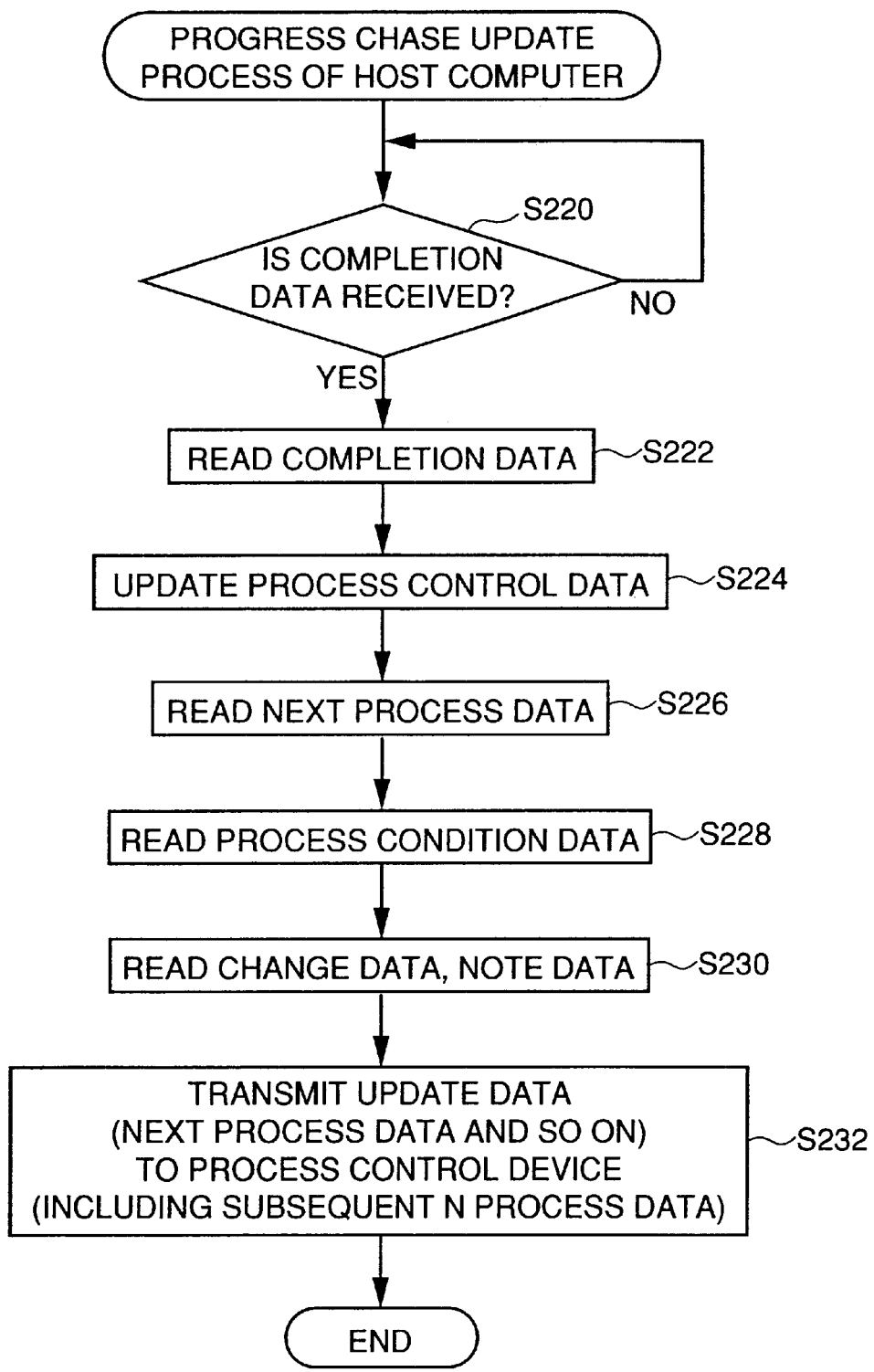
FIG. 14 is a flow chart showing a control flow of a progress chase updating process in a host computer.

With reference to FIG. 14, a program performed in process controlling host computer 200 has the following control structure with regard to a progress chase update process.

At S220, the CPU of process controlling host computer 200 determines whether completion data has been received from process control device 100 or not. If the completion data is received (YES in S220), the process proceeds to S222. If the completion data is not received (NO in S220), the process returns to S220 and waits for completion data from process control device 100.

At S222, the CPU of process controlling host computer 200 reads completion data received at S220. At S224, the CPU of process controlling host computer 200 updates data of the progress chasing table (table shown in FIG. 5) stored in the fixed disc.

For example, when the completion data for a product with the lot number "0004140003" is received, data on completion of process H, which is the second process of product with product number "1002", is stored in the progress chasing table, because data on the completion of the first process has been stored. Specifically, the time of the reception of the completion data and the transmitted completion data are stored in the progress chasing table.

At S226, the CPU of process controlling host computer 200 reads next process data of a lot number corresponding to completion data received at S220. For example, when the completion data of the product with the lot number "0004140003" is received, process H, which is the second process, has completed. Hence, the next process data is a process C, which is the third process for a product with product number "1002".

At S228, the CPU of process controlling host computer 200 reads process condition data of the next process. For example, for the product with the lot number "0004140003" as described above, a process condition indicating amount of cut, 3 mm, in the third process, which is process C, is read.

At S230, the CPU of process controlling host computer 200 reads change data for a lot number corresponding to completion data received at S220. For the product with the lot number "0004140003" as described above, change data is read indicating "change of program number of process D from W2933 to W1540".

At S232, the CPU of process controlling host computer 200 transmits the next process data read at S226, the process condition data read at S228, the change data read at S230, to process control device 100 identified through a sender terminal flag. In this case, transmitted data includes data of subsequent N processes. For example, for the product with the lot number "0004140003" described above, process data representing N processes (processes C, D, K and L) following process H will be transmitted (when N=4) because the second process, which is process H, has been completed.

Next, an operation of process control device 100 based on the above described structure and the flow charts will be described.

Inquiry Process of Process Control Device

When control card 300 attached to the product is inserted into magnetic data read/write unit 108 of process control device 100 (YES in S100), magnetic data stored in magnetic stripe 320 of control card 300 is read (S102). The read magnetic data includes a lot number and data of subsequent N processes. The lot number of read magnetic data is identified (S104) and inquiry data shown in FIG. 15A is transmitted to process controlling host computer 200 based on the identified lot number (S106).

In process controlling host computer 200, when inquiry data is received (YES in S200), next process data is read from the progress chasing table shown in FIG. 5 (S202), process condition data of the next process read at S202 is read from operation process data shown in FIGS. 6 to 10 (S204) and change data and note data corresponding to the lot number included in the inquiry data are read (S206). Process controlling host computer 200 transmits, as a response, data such as next process data read at S202 to S206 to process control device 100 that has transmitted the inquiry data.

In process control device 100, when response data is received from process controlling host computer 200 (YES at S108), write data to be written into image display portions 302 to 316 is generated based on the lot number and so on of the response data shown in FIG. 15B (S110). Images are written into image display portions 302 to 316 using generated write data (S116). When the note includes data such as a designated due date or when change data is provided, an image representing the designated due date or the change data is written with a color different from that of the lot number.

If a predetermined time period has passed without the reception of the response, data for the next one process to be written into image display portions 302 to 316 of the control card is generated based on the data of next N processes read from magnetic stripe 320 provided on the bottom surface of control card 300. Images are written into image display portions 302 to 316 of control card 300 based on the generated data (S116).

Operation Completion Process of Process Control Device

When a process of a product in one process completes, control card 300 attached to the product is inserted into magnetic data read/write unit 108 of process control device 100 (YES in S120). Then, magnetic data stored in magnetic stripe 320 provided on the bottom surface of control card 300 is read (S122), a lot number is identified (S124), and an input of completion data is confirmed through, for example, a push of a completion-indicating button of input/output unit 112 (S126). Then, completion data shown in FIG. 15C is transmitted from process control device 100 to process controlling host computer 200 (S128).

In process controlling host computer 200, when completion data is received (YES in S220), completion data is read (S222) and process control data in the progress chasing table shown in FIG. 5 is updated (S224). Then, next process data of an operation process identified based on the completion data is read (S226), process condition data for the next process is read (S228) and change data and note data corresponding to a lot number identified through the completion data are read (S230). Then, update data shown in FIG. 15D is transmitted to process control device 100 having transmitted the completion data (S232). Here, the update data to be transmitted includes process data representing the subsequent N processes.

When receiving update data from process controlling host computer 200 (YES in S130), process control device 100 writes process data included in received update data corresponding to subsequent N processes into magnetic stripe 320 provided at the bottom surface of control card 300 in a magnetic data format (S132). Then, write data to be written to display on image display portions 302 to 316 of control card 300 is generated based on a lot number and so on included in the received update data.

In process control device 100, if update data is not received from process controlling host computer 200 (NO in S130) and a predetermined time period has passed (YES in S136), the first process data among the next N process data identified from magnetic data is erased and remaining data is written into the magnetic stripe provided on the bottom surface of control card 300 in a magnetic data format (S138). Write data (character image, barcode image) is generated to display on image display portions 302 to 316 of control card 300 based on the process data with the first process data erased therefrom. The generated write data is written into image display portions 302 to 316 as an image through image writing unit 110.

As can be seen from the foregoing, the control card employed in the process control device according to the embodiment includes a magnetic stripe storing a lot number and so on, and an image display portion capable of recording a visually recognizable image. An inquiry can be made on process information of the next process to the process controlling host computer based on a lot number stored in the magnetic data format, and then, data such as a process condition of the next process given as a response can be displayed on the image display portion in a visually recognizable manner. As a result, a process control device can be provided which allows readily confirming an order of operation processes, a process condition of each operation process and so on by the operator. In addition, a plurality of operation processes to be performed are stored in the magnetic stripe as magnetic data corresponding to each lot number. Hence, even when the communication between the process control device and the process controlling host computer is not possible, data such as the next process data can be recorded in a visually recognizable manner based on the magnetic data. As a result, a process control device can be provided which allows the operator to know an order of processes even when the communication with the process controlling host computer becomes impossible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A process control device for controlling a process of producing a product with a medium attached to said product, the medium allowing a recording of data in a first recording manner and a recording of a visually recognizable image for an operator in a second recording manner, comprising:

a read circuit reading data recorded in said first recording manner on said medium;

a transmit circuit, connected to said read circuit, transmitting said data to a computer connected to said process control device;

a receive circuit receiving, from said computer, process data of said product in said process based on said data; and an image recording circuit, connected to said receive circuit, recording an image including a character on said medium in said second recording manner, based on said process data.

2. The process control device according to claim 1 wherein
said process data includes information indicating a subsequent process of said product and
said image includes a character indicating the subsequent process of said product.

3. The process control device according to claim 2 wherein
said process data further includes information indicating a process condition in the subsequent process of said product, and
said image further includes a character indicating a process condition in the subsequent process of said product.

4. The process control device according to claim 3 wherein
said image further includes a barcode indicating a process condition in the subsequent process of said product.

5. The process control device according to claim 1 wherein
said process data includes information indicating a result of an operation in a previous process of said product, and
said image includes a character indicating the result of the operation in the previous process of said product.

6. The process control device according to claim 1 wherein
said image recording circuit includes a circuit recording an image in at least two colors on said medium in said second recording manner, and
said process data includes information representing a color of said image.

7. The process control device according to claim 1 wherein
said receive circuit includes a circuit receiving subsequent process information indicating a plurality of following processes of said product based on said data;
said process control device further comprising a recording circuit recording said subsequent process information on said medium in said first recording manner, and
said image recording circuit includes a recording circuit recording a character indicating the next process on said medium in said second recording manner based on said subsequent process information recorded by said recording circuit when a predetermined condition is satisfied.

8. The process control device according to claim 7 wherein said predetermined condition is that reception of process data by said receive circuit is impossible.

9. A process control device for controlling a process of producing a product with a medium attached to said product, the medium allowing a recording of data in a first recording manner and a recording of a visually recognizable image for an operator in a second recording manner, comprising:
means for reading data recorded in said first recording manner on said medium;
means, connected to said reading means, for transmitting said data to a computer connected to said process control device;
means for receiving process data of said product in said process based on said data from said computer; and
means, connected to said receiving means, for recording an image including a character on said medium based on said process data in said second recording manner.

10. The process control device according to claim 9 wherein
said process data includes information indicating a subsequent process of said product and
said image includes a character indicating the subsequent process of said product.

11. The process control device according to claim 10 wherein
said process data further includes information indicating a process condition in the subsequent process of said product, and
said image further includes a character indicating a process condition in the subsequent process of said product.

12. The process control device according to claim 9 wherein
said process data includes information indicating a result of an operation in a previous process of said product, and
said image includes a character indicating the result of the operation in the previous process of said product.

13. The process control device according to claim 9 wherein
said receiving means includes means for receiving subsequent process information indicating a plurality of following processes of said product based on said data;
said process control device further comprising means for recording said subsequent process information on said medium in said first recording manner, and
said image recording means includes means for recording a character indicating the subsequent process on said medium in said second recording manner based on said subsequent process information recorded by said recording means when a predetermined condition is satisfied.

14. The process control device according to claim 13 wherein said predetermined condition is that reception of process data by said receiving means is impossible.

15. A process control method to control a process of producing a product with a medium attached to said product, the medium allowing a recording of data in a first recording manner and a recording of a visually recognizable image for an operator in a second recording manner, comprising steps of:
reading data recorded in said first recording manner on said medium;
transmitting said data to a computer controlling said process;
receiving process data of said product in said process based on said data from said computer; and
recording an image including a character on said medium in said second recording manner based on said process data.

16. The process control method according to claim 15 wherein
said process data includes information indicating a subsequent process of said product and
said image includes a character indicating the subsequent process of said product.

17. The process control method according to claim 16 wherein
said process data further includes information indicating a process condition in the subsequent process of said product, and said image further includes a character indicating a process condition in the subsequent process of said product.

18. The process control method according to claim 15 wherein
said process data includes information indicating a result of an operation in a previous process of said product, and
said image includes a character indicating a result of the operation in the previous process of said product.

19. The process control method according to claim 15 wherein
said step of receiving process data includes a step of receiving subsequent process information indicating a plurality of following processes of said product based on said data;
said process control method further comprising a step of recording said subsequent process information on said medium in said first recording manner, and
said step of recording an image includes a step of recording a character indicating the subsequent process on said medium in said second recording manner based on said subsequent process information recorded at said step of recording said subsequent process information when a predetermined condition is satisfied.

20. The process control method according to claim 19 wherein said predetermined condition is that reception of process data is impossible at said step of receiving the process data.

* * * * *